United States Patent
Smoke et al.

(10) Patent No.: US 11,181,006 B2
(45) Date of Patent: *Nov. 23, 2021

(54) TURBINE TIP SHROUD ASSEMBLY WITH PLURAL SHROUD SEGMENTS HAVING INTER-SEGMENT SEAL ARRANGEMENT

(71) Applicant: HONEYWELL INTERNATIONAL INC., Morris Plains, NJ (US)

(72) Inventors: Jason Smoke, Phoenix, AZ (US); Kent L. Kime, Phoenix, AZ (US); Blake Petersen, Scottsdale, AZ (US); Luke Zurmehly, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,045

(22) Filed: Mar. 26, 2020

(65) Prior Publication Data

US 2021/0003025 A1 Jan. 7, 2021

Related U.S. Application Data

(63) Continuation of application No. 15/899,756, filed on Feb. 20, 2018, now Pat. No. 10,677,084.

(Continued)

(51) Int. Cl.
*F01D 25/12* (2006.01)
*F01D 11/08* (2006.01)
(Continued)

(52) U.S. Cl.
CPC ............. *F01D 11/08* (2013.01); *F01D 9/04* (2013.01); *F01D 11/005* (2013.01);
(Continued)

(58) Field of Classification Search
None
See application file for complete search history.

(56) References Cited

U.S. PATENT DOCUMENTS 3,963,368 A 6/1976 Emmerson
2,981,609 A 9/1976 Koenig
(Continued)

FOREIGN PATENT DOCUMENTS

EP 0516322 A1 12/1992
EP 2492454 A2 8/2012
(Continued)

OTHER PUBLICATIONS

Stepka, Francis S. and Lawrence P. Ludwig, "Composite Wall Concept for High Temperature Turbine Shrouds - Heat Transfer Analysis," NASA Technical Memorandum 81539, Oct. 13-16, 1980.
(Continued)

*Primary Examiner* — Michael Lebentritt
(74) *Attorney, Agent, or Firm* — Lorenz & Kopf, LLP

(57) ABSTRACT

A shroud assembly for a gas turbine engine includes a plurality of shroud segments that are attached to a shroud support with an inter-segment joint defined between shroud segments. The shroud assembly also includes a cooling flow path cooperatively defined by the shroud support and the first shroud segment. The cooling flow path includes an internal cooling passage within the shroud segments. The cooling flow path includes an outlet chamber configured to receive flow from the internal cooling passage. The shroud assembly additionally includes a seal arrangement that extends across the inter-segment joint. The seal arrangement, the first shroud segment, and the second shroud segment cooperatively define a seal chamber that is enclosed.

20 Claims, 10 Drawing Sheets

Related U.S. Application Data

(60) Provisional application No. 62/521,000, filed on Jun. 16, 2017.

(51) Int. Cl.
  *F01D 9/04* (2006.01)
  *F01D 11/00* (2006.01)
  *F01D 25/24* (2006.01)
  *F01D 11/12* (2006.01)

(52) U.S. Cl.
  CPC ............ *F01D 11/122* (2013.01); *F01D 25/12* (2013.01); *F01D 25/246* (2013.01); *F05D 2240/11* (2013.01); *F05D 2240/55* (2013.01); *F05D 2240/56* (2013.01); *F05D 2260/201* (2013.01); *F05D 2260/204* (2013.01)

(56) References Cited

U.S. PATENT DOCUMENTS

| | | | |
|---|---|---|---|
| 4,013,376 A | 3/1977 | Bisson et al. | |
| 4,157,232 A | 6/1979 | Bobo et al. | |
| 4,303,371 A | 12/1981 | Eckert | |
| 4,526,226 A | 7/1985 | Hsia et al. | |
| 4,573,866 A | 3/1986 | Sandy, Jr. et al. | |
| 5,088,888 A | 2/1992 | Bobo | |
| 5,165,847 A | 11/1992 | Proctor et al. | |
| 5,167,485 A | 12/1992 | Starkweather | |
| 5,649,806 A | 7/1997 | Scricca et al. | |
| 5,988,975 A | 11/1999 | Pizzi | |
| 5,993,150 A | 11/1999 | Liotta et al. | |
| 5,997,245 A | 12/1999 | Tomita et al. | |
| 6,089,822 A | 7/2000 | Fukuno | |
| 6,139,257 A | 10/2000 | Proctor et al. | |
| 6,227,800 B1 | 5/2001 | Spring et al. | |
| 6,254,333 B1 | 7/2001 | Merry | |
| 6,254,345 B1 | 7/2001 | Harris et al. | |
| 6,340,285 B1 | 1/2002 | Gonyou et al. | |
| 6,666,645 B1 | 12/2003 | Arilla et al. | |
| 6,779,597 B2 | 8/2004 | DeMarche et al. | |
| 6,817,189 B2 | 11/2004 | Boeck | |
| 6,942,445 B2 | 9/2005 | Morris et al. | |
| 6,997,673 B2 | 2/2006 | Morris et al. | |
| 7,063,503 B2 | 6/2006 | Meisels | |
| 7,147,431 B2 | 12/2006 | Maguire et al. | |
| 7,147,432 B2 | 12/2006 | Lowe et al. | |
| 7,306,424 B2 | 12/2007 | Romanov et al. | |
| 7,604,453 B2 | 10/2009 | Lee et al. | |
| 7,665,962 B1 | 2/2010 | Liang | |
| 7,722,315 B2 | 5/2010 | Lee et al. | |
| 8,118,548 B2 | 2/2012 | Nigmatulin et al. | |
| 8,182,199 B2 | 5/2012 | Farah et al. | |
| 8,240,980 B1 | 8/2012 | Liang | |
| 8,313,301 B2 | 11/2012 | Hudson | |
| 8,353,663 B2 | 1/2013 | Arzel et al. | |
| 8,439,629 B2 | 5/2013 | Pietraszkiewicz et al. | |
| 8,814,507 B1 | 8/2014 | Campbell et al. | |
| 8,826,668 B2 | 9/2014 | Lee et al. | |
| 9,028,744 B2 | 5/2015 | Durocher et al. | |
| 9,500,095 B2 | 11/2016 | Pietrobon et al. | |
| 9,611,754 B2 | 4/2017 | Taylor | |
| 9,657,642 B2 | 5/2017 | Kanjiyani et al. | |
| 9,677,412 B2 | 6/2017 | Jones et al. | |
| 9,689,273 B2 | 6/2017 | Jones et al. | |
| 9,689,276 B2 | 6/2017 | Lefebvre et al. | |
| 10,677,084 B2 * | 6/2020 | Smoke | F01D 11/122 |
| 10,900,378 B2 * | 1/2021 | Smoke | F01D 5/225 |
| 2002/0154992 A1 | 10/2002 | Tiemann | |
| 2003/0133790 A1 | 7/2003 | Darkins, Jr. et al. | |
| 2004/0101400 A1 | 5/2004 | Maguire et al. | |
| 2005/0111965 A1 | 5/2005 | Lowe et al. | |
| 2005/0126181 A1 | 6/2005 | Wilson et al. | |
| 2005/0232752 A1 | 10/2005 | Meisels | |
| 2006/0159549 A1 | 7/2006 | Durocher et al. | |
| 2007/0020087 A1 | 1/2007 | Durocher et al. | |
| 2007/0025837 A1 | 2/2007 | Pezzetti, Jr. et al. | |
| 2008/0131264 A1 | 6/2008 | Lee et al. | |
| 2009/0155051 A1 | 6/2009 | Lee et al. | |
| 2013/0051979 A1 | 2/2013 | Durocher et al. | |
| 2014/0271105 A1 | 9/2014 | Pietrobon et al. | |
| 2015/0013345 A1 | 1/2015 | Porter et al. | |
| 2015/0075178 A1 | 3/2015 | Halfmann et al. | |
| 2016/0040553 A1 | 2/2016 | Headland | |
| 2016/0169037 A1 | 6/2016 | Lefebvre et al. | |
| 2016/0215641 A1 | 7/2016 | Farah et al. | |
| 2016/0348526 A1 | 12/2016 | Vetters et al. | |
| 2017/0058684 A1 | 3/2017 | Correia et al. | |
| 2017/0175572 A1 | 6/2017 | Vetters | |
| 2017/0183978 A1 | 6/2017 | Eng et al. | |
| 2018/0258790 A1 | 9/2018 | Jain et al. | |
| 2018/0313221 A1 | 11/2018 | Filippi | |
| 2018/0363499 A1 | 12/2018 | Smoke et al. | |

FOREIGN PATENT DOCUMENTS

| | | |
|---|---|---|
| EP | 2957728 A1 | 6/2014 |
| EP | 3190265 A1 | 7/2017 |
| EP | 1176285 A2 | 1/2020 |
| WO | 2004057159 A1 | 7/2004 |
| WO | 2013162928 A1 | 10/2013 |
| WO | 2016028310 A1 | 2/2016 |

OTHER PUBLICATIONS

Tamunobere, Onieluan, "Heat Transfer and Film Cooling on a Gas Turbine Blade and Shroud," LSU Doctoral Dissertations, LSU Digital Commons, May 2015.

Kanjirakkad, Vasundevan, et al., "Passive Shroud Cooling Concepts for HP Turbines: Experimental Investigations," Journal of Turbomachinery, Jan. 28, 2008.

Passive Shroud Cooling in High Pressure Turbines, Whittle Laboratory, Mar. 2000.

Youlong, Fang, et al., The Radial Displacement of the HPT Blade Under the Effects of the Temperature Field and the Centrifugal, Science Direct, Jan. 2012.

\* cited by examiner

TURBINE TIP SHROUD ASSEMBLY WITH PLURAL SHROUD SEGMENTS HAVING INTER-SEGMENT SEAL ARRANGEMENT

CROSS-REFERENCE TO RELATED APPLICATIONS

This application is a continuation of U.S. patent application Ser. No. 15/899,756, filed Feb. 20, 2018, which claims priority to U.S. Provisional Patent Application Ser. No. 62/521,000, filed Jun. 16, 2017, the entire disclosures of which are incorporated by reference herein.

STATEMENT REGARDING FEDERALLY SPONSORED RESEARCH OR DEVELOPMENT

This invention was made with Government support under W58RGZ-16-C-0046 awarded by the U.S. Army. The Government has certain rights in the invention.

TECHNICAL FIELD

The present disclosure generally relates to a turbine tip shroud assembly and, more particularly, to a turbine tip shroud assembly with plural shroud segments having an inter-segment seal arrangement.

BACKGROUND

Gas turbine engines are generally used in a wide range of applications, such as aircraft engines and auxiliary power units. In a gas turbine engine, air is compressed in a compressor, mixed with fuel, and ignited in a combustor to generate hot combustion gases, which flow downstream into a turbine section. In a typical configuration, the turbine section includes airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. For example, it is desirable to cool the shroud in the turbine section (i.e., the turbine shroud) to prevent or reduce oxidation, thermo-mechanical fatigue, and/or other adverse impacts. However, given the high temperature of engine operation, cooling remains a challenge.

Accordingly, it is desirable to provide gas turbine engines with improved turbine shroud cooling. Furthermore, other desirable features and characteristics of the present disclosure will become apparent from the subsequent detailed description and the appended claims, taken in conjunction with the accompanying drawings and this background discussion.

BRIEF SUMMARY

In one embodiment, a shroud assembly is disclosed for a gas turbine engine. The shroud assembly includes a shroud support that extends arcuately about an axis. The shroud assembly also includes a plurality of shroud segments that are attached to the shroud support and that are arranged annularly about the axis at different circumferential positions with respect to the axis. The plurality of shroud segments include a first shroud segment and a second shroud segment. An inter-segment joint is defined circumferentially between the first and second shroud segments. The shroud assembly also includes a cooling flow path cooperatively defined by the shroud support and the first shroud segment. The cooling flow path includes an internal cooling passage defined within the first shroud segment. The cooling flow path includes an outlet chamber configured to receive flow from the internal cooling passage. The outlet chamber is defined between the first shroud segment and the shroud support and fluidly connected to the inter-segment joint. The shroud assembly additionally includes a seal arrangement that extends across the inter-segment joint. The seal arrangement, the first shroud segment, and the second shroud segment cooperatively define a seal chamber that is enclosed.

In another embodiment, a method of manufacturing a shroud case assembly is disclosed. The method includes attaching a plurality of shroud segments to a shroud support. The shroud support extends arcuately about an axis. The plurality of shroud segments are arranged annularly about the shroud support at different circumferential positions with respect to the axis. The plurality of shroud segments include a first shroud segment and a second shroud segment. An inter-segment joint is defined circumferentially between the first and second shroud segments. The method also includes fluidly connecting an internal cooling passage of the first shroud segment to a shroud support inlet of the shroud support to define a cooling flow path. The cooling flow path includes an outlet chamber defined between the first shroud segment and the shroud support. The outlet chamber is fluidly connected to the inter-segment joint. The method additionally includes extending a seal arrangement across the inter-segment joint to define a seal chamber that is enclosed within the inter-segment joint between the first and second shroud segments.

Furthermore, a gas turbine engine is disclosed that includes a rotor assembly of a turbine section. The gas turbine engine includes a shroud assembly that surrounds the rotor assembly. The shroud assembly includes a shroud support that extends arcuately about an axis. The shroud assembly includes a plurality of shroud segments that are attached to the shroud support and that are arranged annularly about the axis at different circumferential positions with respect to the axis. The plurality of shroud segments include a first shroud segment and a second shroud segment. An inter-segment joint is defined circumferentially between the first and second shroud segments. The shroud assembly further includes a cooling flow path cooperatively defined by the shroud support and the first shroud segment. The cooling flow path includes an internal cooling passage defined within the first shroud segment. The cooling flow path includes an outlet chamber configured to receive flow from the internal cooling passage. The outlet chamber is defined between the first shroud segment and the shroud support and is fluidly connected to the inter-segment joint. Moreover, the shroud assembly includes a seal arrangement that extends across the inter-segment joint. The seal arrangement includes a first sealing member and a second sealing member. Furthermore, the shroud assembly includes a second sealing member that extends across the inter-segment joint. The second sealing member is sealed to the shroud support, the first shroud segment, and the second shroud segment proximate a trailing edge of the shroud assembly. The seal arrangement includes a first portion proximate a leading edge of the shroud assembly at which the first sealing member and the second sealing member overlap and are in abutting contact. The seal arrangement includes a chamber portion at which the first sealing member and the second sealing member are separated apart at a distance to define a wedge-shaped seal chamber that is enclosed between the first and second shroud segments. The seal arrangement includes a third portion proximate the trailing edge of the shroud assembly at which the first sealing member and the second sealing member overlap and are in abutting contact. The chamber portion is enclosed and disposed between the first portion and the third portion.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
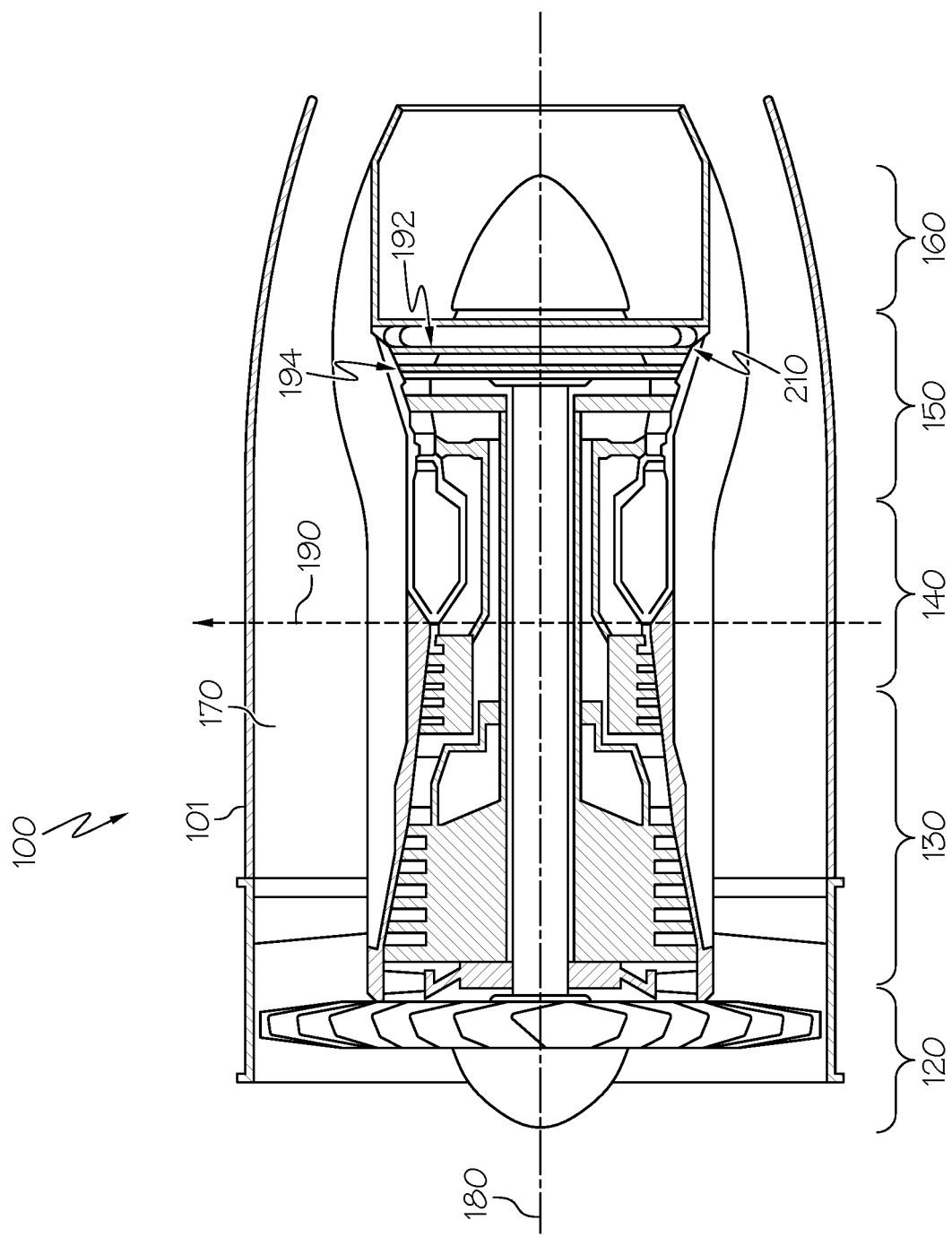
FIG. 1 is a schematic side view of a gas turbine engine according to exemplary embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

Broadly, exemplary embodiments disclosed herein include gas turbine engines with one or more turbine shroud assemblies having improved cooling characteristics. Methods of manufacturing the turbine shroud assembly are also disclosed. In particular, exemplary embodiments include a turbine shroud assembly with internal impingement cooling passages configured for internally cooling components of the shroud assembly.

A shroud assembly is disclosed according to example embodiments, wherein the assembly includes a plurality of shroud segments that are independently attached and sealed to a shroud support case. As such, the shroud segments and the shroud support case cooperate to define cooling flow passages for cooling the shroud segments and for directing the cooling fluid (e.g., air) to flow back into the core flow. The shroud segments may include internal cooling passages as well for cooling the segment. The internal cooling passages may be substantially airtight except for the one or more defined inlets and the one or more defined outlets of the shroud segment.

Furthermore, the shroud assembly may include one or more sealing members that improve flow characteristics of the shroud assembly. For example, the shroud segments may be attached to the shroud case assembly so as to define a plurality of inter-segment joints between neighboring shroud segments. The shroud assembly may include at least one sealing member (e.g., one or more feather seals) at a respective inter-segment joint. In some embodiments, the assembly may include plural (e.g., two) feather seals at the inter-segment joints. The feather seals may be spaced apart at a distance from one another near the trailing edge, such that an intermediate cavity is created between the spent cooling air and the flow path. This reduces inter-segment leakage at the trailing edge, where the static pressure of the flow path is lowest.

Other details of the present disclosure will be discussed below with reference to the drawings. It will be appreciated that the embodiments of the present disclosure shown in the drawings are examples, and that the embodiments may vary from those shown without departing from the scope of the present disclosure.

FIG. 1 is a cross-sectional view of a gas turbine engine 100 according to an exemplary embodiment. Although FIG. 1 depicts a turbofan engine, in general, exemplary embodiments discussed herein may be applicable to another type of engine without departing from the scope of the present disclosure. The gas turbine engine 100 may form part of, for example, an auxiliary power unit for an aircraft or a propulsion system for an aircraft. However, the gas turbine engine 100 may be included on another vehicle without departing from the scope of the present disclosure. Instead of being included on a vehicle, the gas turbine engine 100 may also be supported by a stationary mount in some embodiments.

The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160, which are arranged sequentially along a longitudinal axis 180.

For reference purposes, the gas turbine engine 100 will be discussed with reference to a radial coordinate system. Accordingly, as used herein, the term "axial" refers to a direction along the longitudinal axis 180. A radial axis 190 is also included in FIG. 1 for reference purposes, and the term "radial" as used herein refers to a direction along the radial axis 190 or along another line extending radially with respect to the axis 180. Moreover, the term "circumferential" as used herein refers to a direction extending around or about the axis 180, at a particular radial distance from the axis 180.

The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140.

In the combustion section 140, the high pressure air is mixed with fuel, which is combusted. The post-combustion air is then directed into the turbine section 150.

The turbine section 150 may include a series of rotor assemblies 192 and stator assemblies 194, both of which are represented schematically in FIG. 1. The turbine section 150 may also include one or more shroud assemblies 210, which are also represented schematically. The shroud assembly 210 may generally encircle a respective rotor assembly 192. The shroud assembly 210 may encircle the tips of blades of the rotor assembly 192 and, thus, may be referred to as a turbine tip shroud assembly.

During operation, post-combustion air from the combustion section 140 may be directed by the stator assembly 194 toward blades included in the rotor assembly 192. The post-combustion air impinges upon the rotor blades, thereby driving and rotating the rotor assembly 192 relative to the turbine shroud assembly 210, causing the rotor assembly 192 to rotate a main engine shaft for energy extraction. The flow may be directed through a propulsion nozzle disposed in the exhaust section 160 to provide additional forward thrust.

To allow the turbine section 150 to operate at desirable elevated temperatures, certain components are cooled. For example, in some embodiments, the shroud assembly 210 may include one or more features of the present disclosure that promote cooling. Manufacturing techniques of the present disclosure are also discussed below for providing the shroud assembly 210 with the cooling features of the present disclosure.

Figure 2:
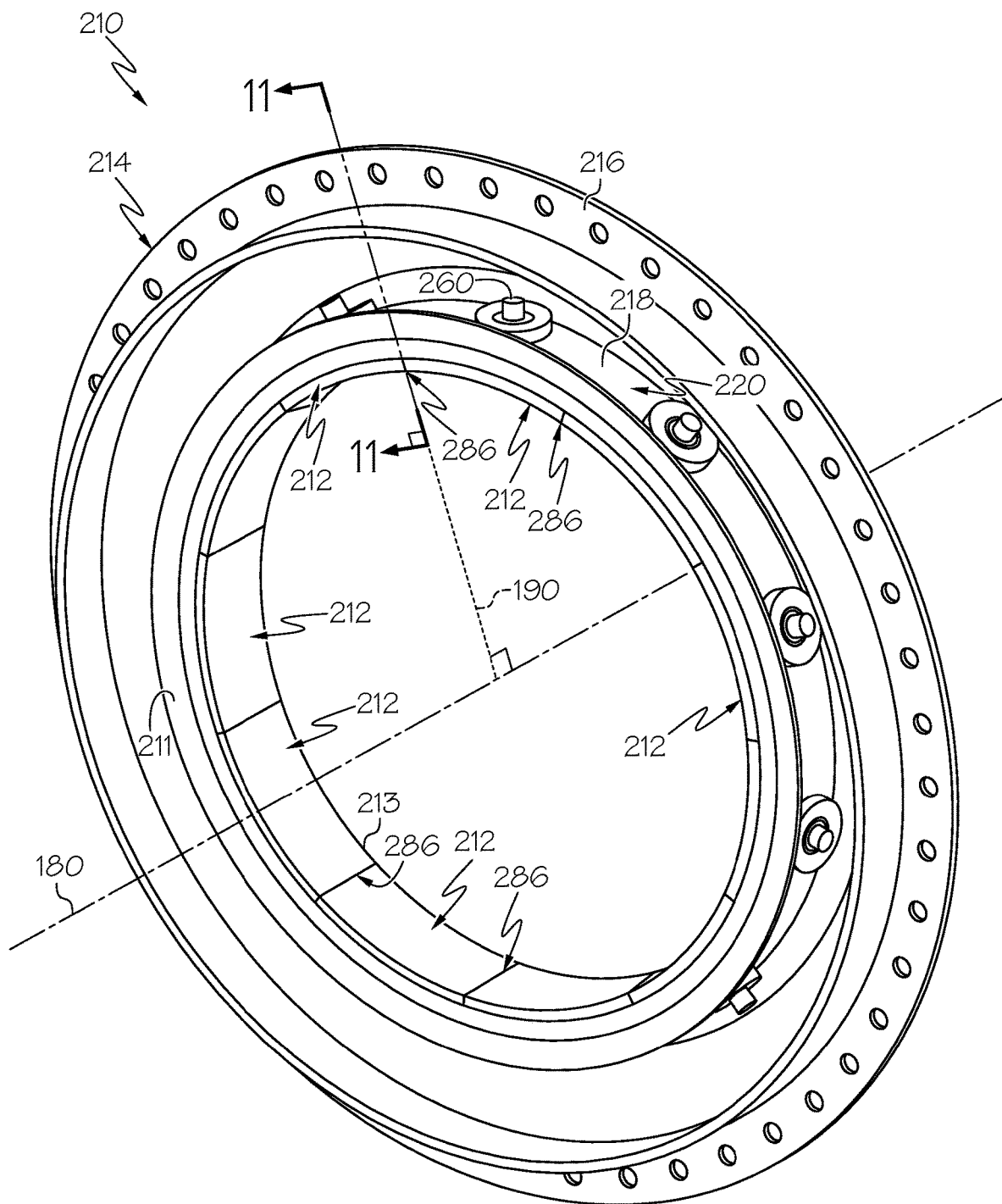
FIG. 2 is an isometric view of a turbine shroud assembly of the gas turbine engine of FIG. 1 according to example embodiments of the present disclosure.
Figure 3:
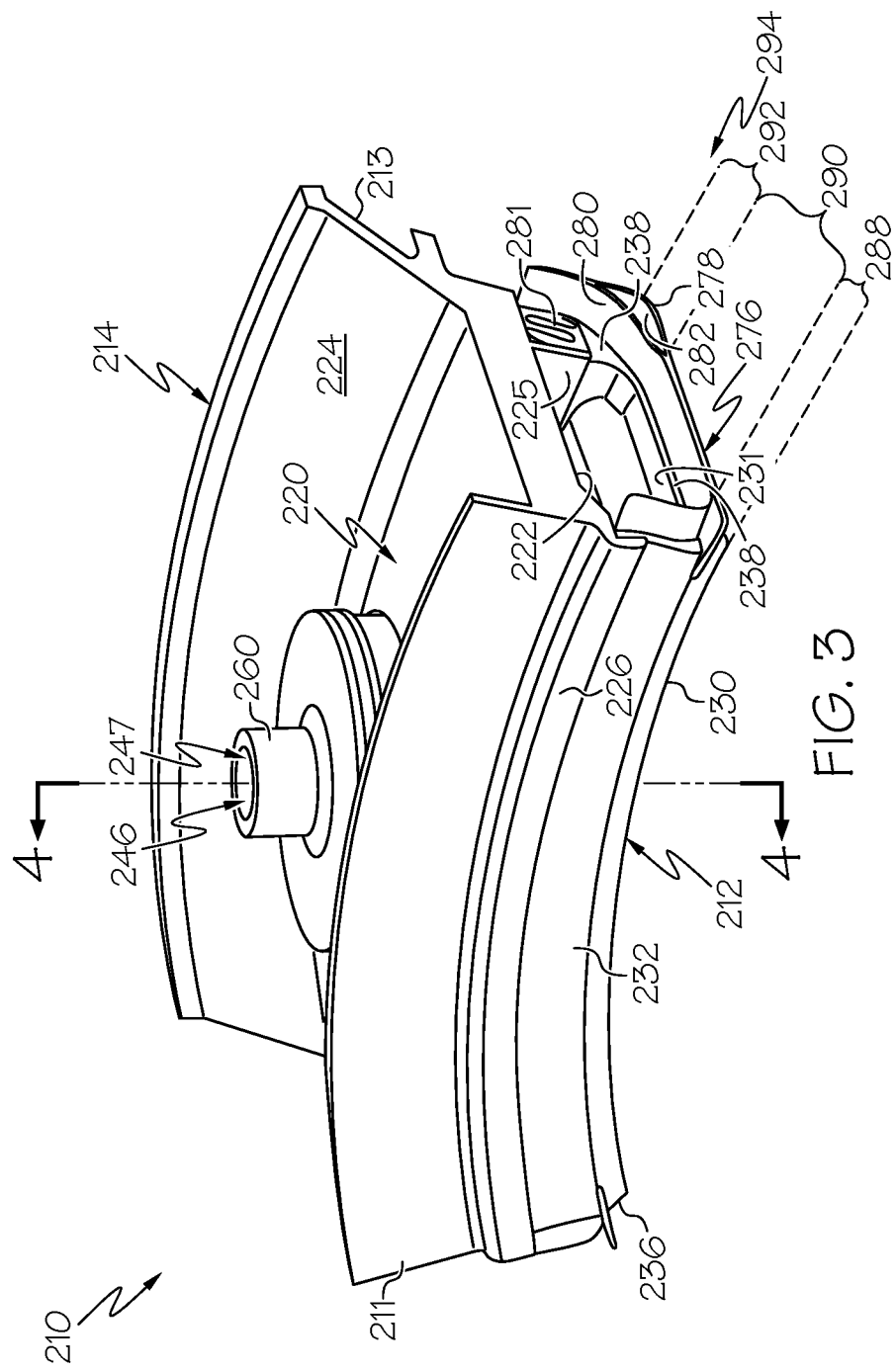
FIG. 3 is an isometric view of a portion of the turbine shroud assembly of FIG. 2, which includes a single shroud segment according to example embodiments of the present disclosure.
Figure 4:
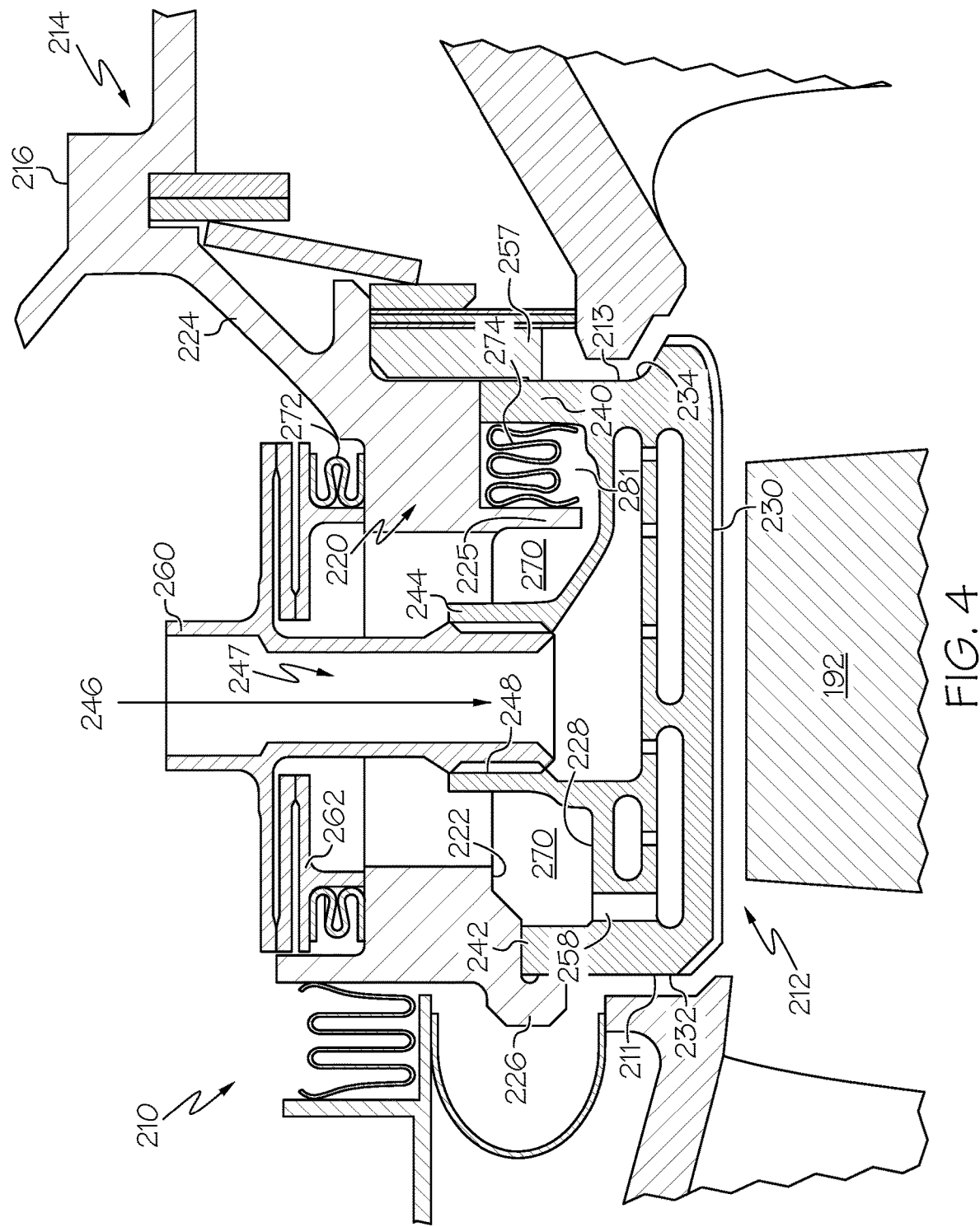
FIG. 4 is a section view of the turbine shroud assembly taken along the line 4-4 of FIG. 3.

Referring now to FIGS. 2, 3, and 4, the turbine shroud assembly 210 is shown in detail according to example embodiments. The turbine shroud assembly 210 may be substantially annular and may extend continuously in a circumferential direction about the longitudinal axis 180 (FIG. 2). The turbine shroud assembly 210 includes a leading edge 211 and a trailing edge 213, which are separated at a distance along the longitudinal axis 180. The leading edge 211 faces generally in a forward direction along the axis 180, and the trailing edge 213 faces generally in a rearward direction along the axis 180.

As shown in FIG. 2, the turbine shroud assembly 210 may include a shroud support 214. The shroud support 214 may be a substantially unitary, one-piece, annular component with at least a portion that extends continuously about the axis 180. The shroud support 214 may include an outer diameter portion 216 and an inner diameter portion 218. The outer diameter portion 216 may be fixedly attached to the engine case 101 (FIG. 1) or other surrounding support structure. The inner diameter portion 218 may include an inner ring 220. A circumferential segment of the inner ring 220 is shown in FIG. 3 and is shown in the section view of FIG. 4. As shown in FIGS. 3 and 4, the inner ring 220 may include an inner diameter surface 222. The inner ring 220 may also include a support arm 224, which attaches the inner ring 220 to the outer diameter portion 216. The shroud support 214 may further include a trailing edge member 225 and a leading edge member 226 (FIG. 3). As shown, the trailing edge member 225 and the leading edge member 226 may extend radially inward toward the longitudinal axis 180 from the inner ring 220. The trailing edge member 225 and the leading edge member 226 may be spaced apart along the axis 180.

Additionally, as shown in FIG. 2, the turbine shroud assembly 210 may include a plurality of shroud segments 212 that are arranged annularly about the axis 180. The shroud segments 212 may be spaced circumferentially about the inner diameter surface 222 of the inner ring 220. An individual shroud segment 212 from a particular circumferential position (with respect to the axis 180) is shown in FIGS. 3-6 in detail. The shroud segment 212 is attached to a portion of the inner ring 220 in FIGS. 3 and 4. The individual shroud segment 212 is shown in isolation in FIGS. 5 and 6.

In some embodiments, the shroud segment 212 may be a monolithic, unitary, one-piece member. In other embodiments, the shroud segment 212 may be constructed from multiple pieces that are attached. It will be appreciated that the shroud segment 212 of FIGS. 4-6 may be representative of other shroud segments at different circumferential positions on the shroud support 214.

Figure 5:
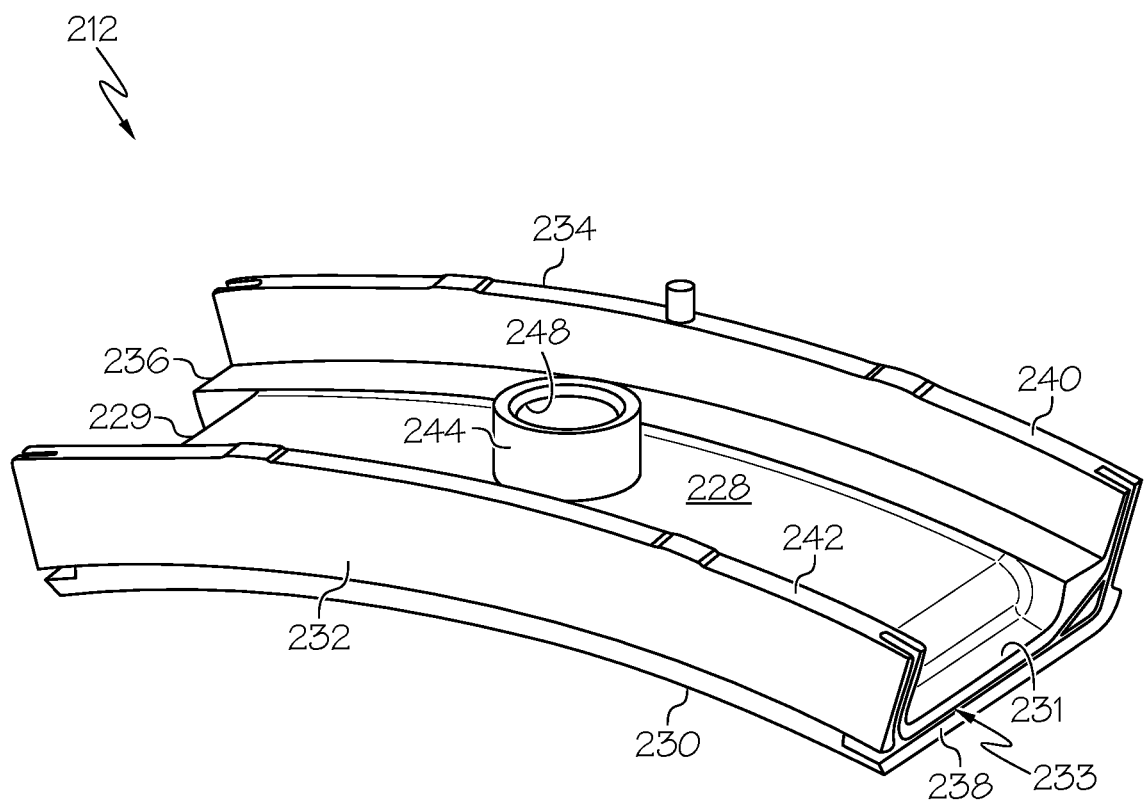
FIG. 5 is an isometric view of the shroud segment of FIG. 3.
Figure 6:
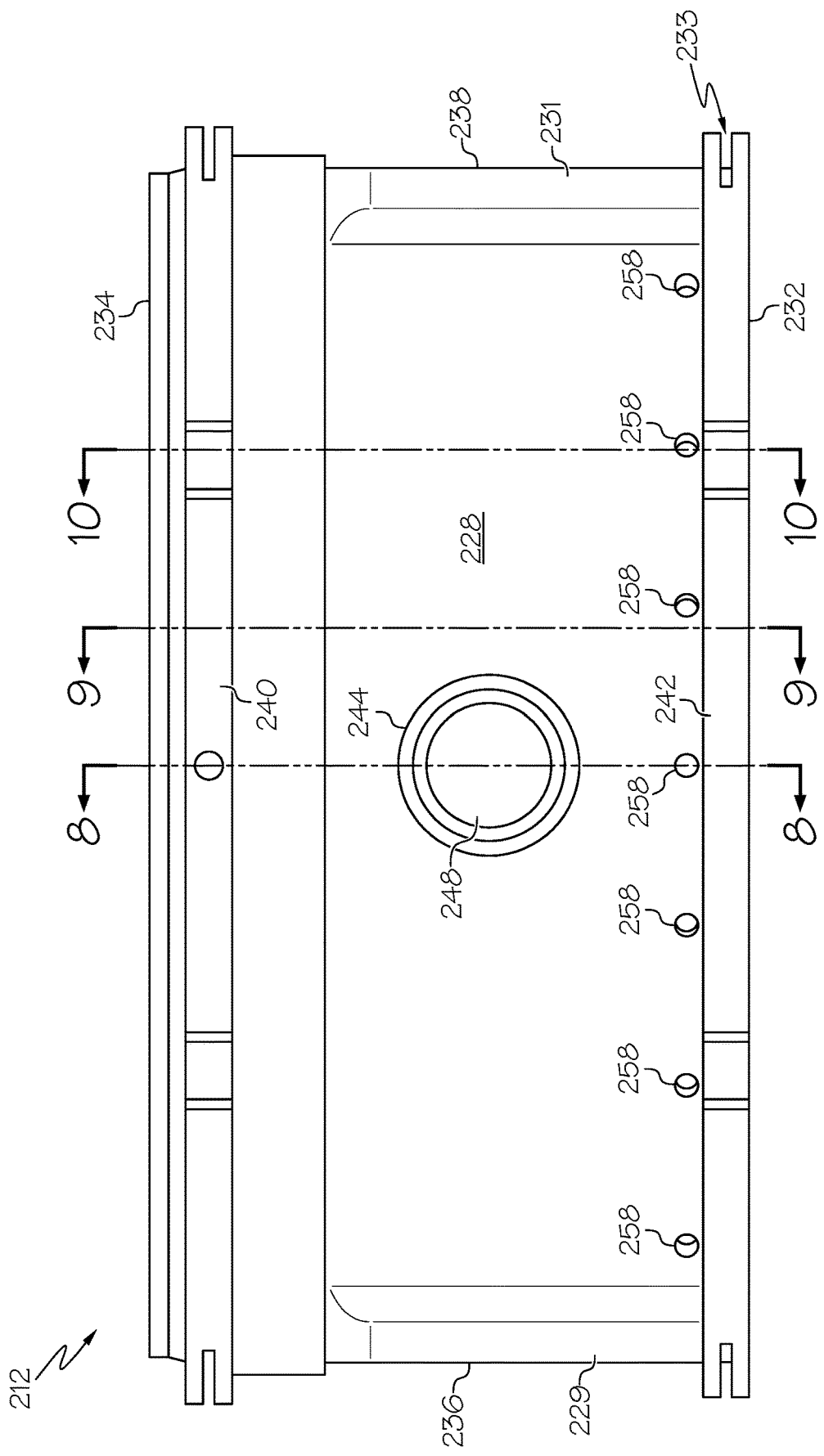
FIG. 6 is a top view of the shroud segment of FIG. 5.

As shown in FIGS. 4, 5 and 6, the shroud segment 212 may include an outer diameter surface 228 and an opposite inner diameter surface 230. The shroud segment 212 may further include an upstream face 232 and an opposite downstream face 234, which are spaced apart along the axis 180. The shroud segment 212 may also include a first end 236 and a second end 238. The shroud segment 212 may be elongate and slightly arcuate in the circumferential direction between the first end 236 and the second end 238. The shroud segment 212 may further include a trailing edge rail 240 and a leading edge rail 242. The trailing edge rail 240 and the leading edge rail 242 may project radially outward from the outer diameter surface 228 and away from the axis 180. The outer diameter surface 228 may also include a first end recess 229 proximate the first end 236 and a second end recess 231 proximate the second end 238.

Figure 7:
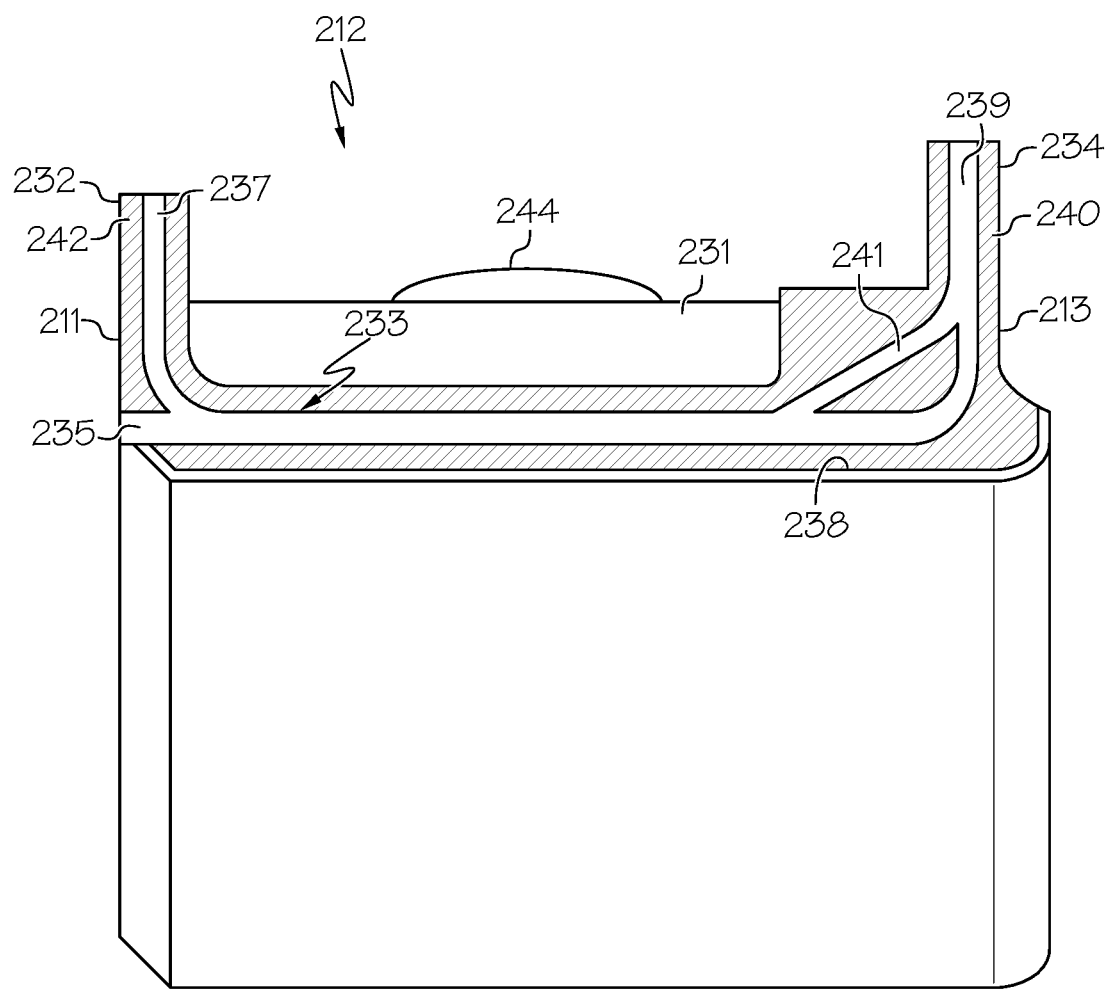
FIG. 7 is an end view of the shroud segment of FIG. 5.

The first end 236 and/or the second end 238 may include an arrangement of one or more grooves 233. As shown in FIG. 7, the grooves 233 may include a first groove 235. The first groove 235 may extend axially along the shroud segment 212 from the upstream face 232 and may stop short of the downstream face 234. The grooves 233 may also include a second groove 237 that extends radially along the leading edge rail 242 and that curves rearwardly to intersect the first groove 235. The grooves 233 may further include a third groove 239 that extends radially along the trailing edge rail 240 and that curves forward to intersect the first groove 235. Moreover, the grooves 233 may include a fourth groove 241 that extends diagonally between and that intersects both the first groove 235 and the third groove 239.

As shown in FIGS. 5 and 6, the shroud segment 212 may further include a projection 244. The projection 244 may be annular and may project radially away from the outer diameter surface 228. In some embodiments, the projection 244 may be disposed in a central region of the outer diameter surface 228, substantially centered axially between the upstream face 232 and the downstream face 234 and/or substantially centered circumferentially between the first end 236 and the second end 238. The projection 244 may be hollow, and the inner diameter of the projection 244 may be threaded in some embodiments.

Figure 8:
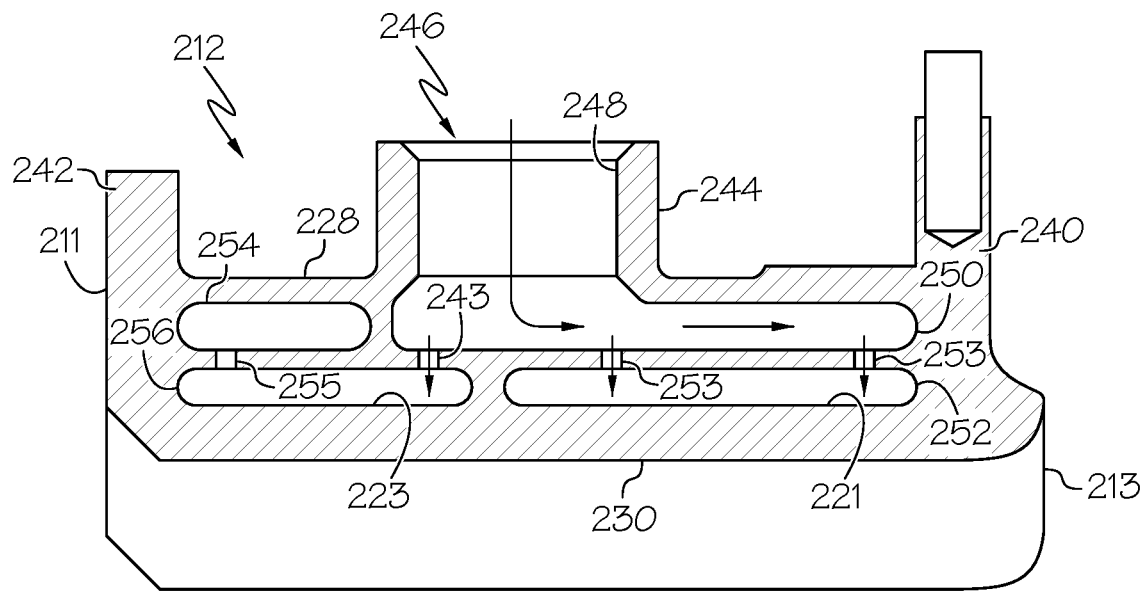
FIG. 8 is a section view of the shroud segment taken along the line 8-8 of FIG. 6.
Figure 9:
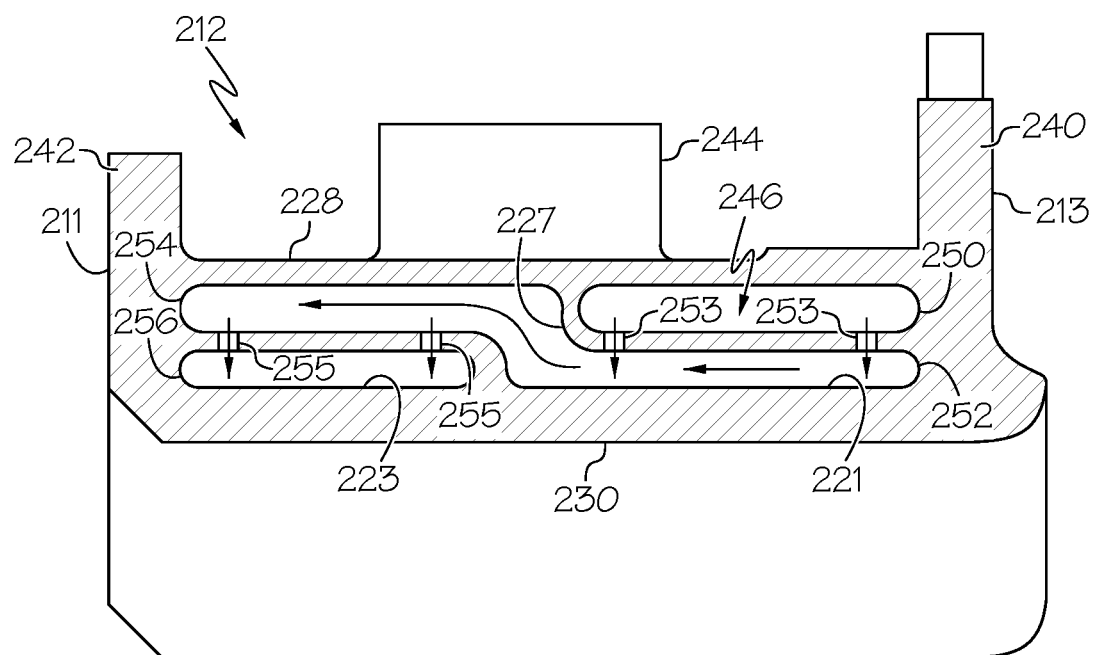
FIG. 9 is a section view of the shroud segment taken along the line 9-9 of FIG. 6.
Figure 10:
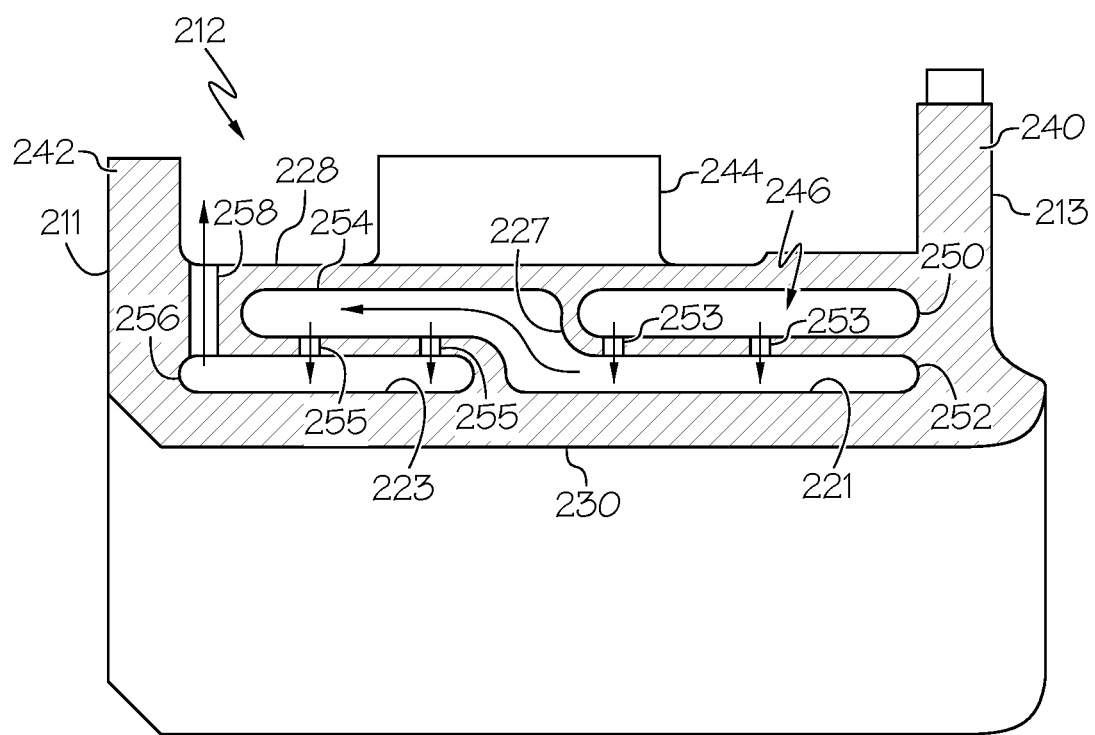
FIG. 10 is a section view of the shroud segment taken along the line 10-10 of FIG. 6.

The shroud segment 212 may include at least one internal cooling passage 246 as shown in FIGS. 8, 9, and 10. As shown in FIG. 8, the projection 244 may define an inlet 248 of the internal cooling passage 246.

The passage 246 of the shroud segment 212 may include a first chamber 250 and a second chamber 252. The first and second chambers 250, 252 may have a cross section that is elongated along the axis 180 and that extends substantially parallel to the axis 180. The first chamber 250 and the second chamber 252 may extend in the circumferential direction as well. The first and second chambers 250, 252 may be disposed proximate the trailing edge 213 and may be overlapped in the radial direction as shown. The first chamber 250 may be disposed outboard radially with respect to the second chamber 252 (i.e., the second chamber 252 may be disposed closer to the axis 180 in the radial direction as compared to the first chamber 250). The second chamber 252 may be partly defined by a trailing backside surface 221 of the shroud segment 212 (i.e., the surface opposite the inner diameter surface 230 proximate the trailing edge 213).

The first and second chambers 250, 252 may be fluidly connected by one or more first impingement apertures 253. The first impingement apertures 253 may extend radially through an internal wall separating the first and second chambers 250, 252.

The passage 246 of the shroud segment 212 may further include a third chamber 254 and a fourth chamber 256 as shown in FIGS. 9 and 10. The third and fourth chambers 254, 256 may have a cross section that is elongated along the axis 180 and that extends substantially parallel to the axis 180. The third chamber 254 and the fourth chamber 256 may extend in the circumferential direction as well. The third chamber 254 and the fourth chamber 256 may be disposed proximate the leading edge 211 and may be overlapped in the radial direction as shown. The third chamber 254 may be disposed outboard radially with respect to the fourth chamber 256. The fourth chamber 256 may be defined by a forward backside surface 223 of the shroud segment 212 (i.e., the surface opposite the inner diameter surface 230 proximate the leading edge 211).

The third chamber 254 may be fluidly connected to the second chamber 252 via an intermediate opening 227 as shown in FIGS. 9 and 10. The intermediate opening 227 may be relatively wide so as to facilitate fluid flow from the second chamber 252 to the third chamber 254.

Also, the third chamber 254 may be fluidly connected to the fourth chamber 256 by one or more second impingement apertures 255. The second impingement apertures may extend radially through an internal wall separating the third and fourth chambers 254, 256.

In some embodiments, there may be at least one third impingement aperture 243 (FIG. 8). The third impingement aperture 243 may fluidly connect the first chamber 250 and the fourth chamber 256.

Moreover, the shroud segment 212 may define one or more outlets 258 of the internal cooling passage 246 (FIGS. 6 and 10). In the illustrated embodiment, there are a plurality of outlets 258. As shown, the outlets 258 may be circular through-holes that extend radially from the fourth chamber 256 and through the outer diameter surface 228. In some embodiments, the outlets 258 may be disposed proximate the leading edge rail 242 (FIG. 10), and the outlets 258 may be spaced apart from each other in the circumferential direction (FIG. 6).

As shown in FIGS. 2, 3, and 4, the shroud segments 212 may be fixedly attached to the shroud support 214. The shroud segments 212 may be independently and individually attached to the shroud support 214. Also, the shroud segments 212 may be substantially sealed (e.g., substantially hermetically sealed) to the shroud support 214, and the internal cooling passage 246 may be fluidly connected to related flow paths of the shroud support 214. As such, the shroud segment 212 and the shroud support 214 may cooperate to define a cooling airflow path 247. As will be discussed, the inlet 248 and the outlets 258 may define part of the cooling airflow path 247.

In some embodiments, the shroud segment 212 may be fixed to the shroud support 214 via a fastener 260. In some embodiments, the fastener 260 may be the only fastener 260 used for the attachment of the respective shroud segment 212 and the shroud support 214. The fastener 260 may be hollow and tubular in some embodiments. Additionally, in some embodiments, the fastener 260 may extend radially through the shroud support 214 to be received within the projection 244. In some embodiments, the fastener 260 may threadably engage the inner diameter of the projection 244. Accordingly, the interior of the fastener 260 may be fluidly connected to the inlet 248 of the internal cooling passages 246. Also, the fastener 260 may include an enlarged head 262 that engages the outer diameter surface of the ring 220. The fastener 260 may also include one or more support structures that support the fastener 260, allow for thermal expansion, etc. Accordingly, the fastener 260 may press the outer diameter portions of the shroud segment 212 to the inner diameter surface 222 of the ring 220 and apply a force that is directed substantially in the radial direction.

When attached (FIG. 4), the leading edge rail 242 of the shroud segment 212 may be disposed proximate the leading edge member 226 of the shroud support 214. The upstream face 232 may be disposed adjacent the opposing surface of the leading edge member 226. Also, the trailing edge rail 240 of the shroud segment 212 may be disposed proximate the trailing edge member 225 of the shroud support 214. An axial retention member 257 may be included proximate the trailing edge rail 240. The axial retention member 257 may abut the trailing edge rail 240 and apply an axial load. Accordingly, the axial retention member 257 may substantially seal against the rail 240 due to the axial load. In some embodiments, the axial retention member 257 may include or comprise a so-called brush seal. A trailing edge space 281 may be defined between the trailing edge rail 240, the trailing edge member 225 and the outer diameter surface 228 of the shroud segment 212.

Moreover, the shroud segment 212 may cooperate with the shroud support 214 to define an outlet chamber 270 of the cooling flow path 247. Specifically, in some embodiments, the outer diameter surface 228 and the leading edge rail 242 of the shroud segment 212 may cooperate with the inner diameter surface 222 and the trailing edge member 225 of the shroud support 214 to define the outlet chamber 270. The outlet chamber 270 may be generally arcuate in shape and may extend in the circumferential direction toward the first end 236 and the second end 238 of the shroud segment 212.

The shroud assembly 210 may further include one or more sealing members that seal gap(s) between plural components. In some embodiments, the sealing members may be arranged for directing flow in a predetermined manner.

For example, as shown in FIG. 4, the shroud assembly 210 may include a first sealing member 272 that is disposed between the head 262 of the fastener and the outer diameter surface of the ring 220 of the shroud support 214. The first sealing member 272 may be a flexible metal seal in some embodiments.

The shroud assembly 210 may further include a second sealing member 274. In some embodiments, the second sealing member 274 may be an annular seal that extends continuously about the axis 180. In some embodiments, the second sealing member 274 may be formed from a metallic material. The second sealing member 274 may be disposed proximate the trailing edge 213, for example, within the trailing edge space 281. The axial ends of the second sealing member 274 may seal to the opposing axial faces of the trailing edge rail 240 of the shroud segments 212 and the trailing edge member 225 of the shroud support 214. Also, the second sealing member 274 may include a plurality of folds, wrinkles, overlapping areas, convolutions, bellows, etc. as shown in the cross sections of FIGS. 3, 4, and 11. Accordingly, the second sealing member 274 may flex to extend and/or retract in the axial direction, for example, due to thermal expansion of the shroud assembly 210. The second sealing member 274 may also partly define the outlet chamber 270 and may be configured as a fluid boundary proximate the trailing edge 213.

The shroud assembly 210 may also include other sealing members, such as a sealing compound that is included at the threaded attachment of the fastener 260 and the projection 244. Other sealing members may also be included in some embodiments. Accordingly, the shroud segment 212 may be substantially hermetically sealed to the shroud support 214.

Furthermore, as shown in FIG. 3, the shroud assembly 210 may include an inter-segment seal arrangement 276. In some embodiments, seal arrangement 276 may include a third sealing member 278 and a fourth sealing member 280. The third sealing member 278 and the fourth sealing member 280 may be so-called feather seals. Accordingly, the third and fourth sealing members 278, 280 may be thin and strip-like. The third and fourth sealing members 278, 280 may be disposed within an inter-segment joint 286 (FIG. 2) that is defined between neighboring pairs of the shroud segments 212. The joint 286 may be a narrow slot that extends axially between the respective pair of shroud segments 212 and may be open at the leading edge 211 and the trailing edge 213. More specifically, the third and fourth sealing members 278, 280 may extend circumferentially across the inter-segment joint 286 to create a seal and to affect fluid flow therein. In some embodiments, the third and fourth sealing members 278, 280 may be partly attached to the neighboring shroud members 212.

More specifically, in FIG. 3, the third and fourth sealing members 278, 280 are shown attached to the second end 238 of one shroud segment 212 (a first shroud segment) and shown projected outward circumferentially therefrom. It will be appreciated that these sealing members 278, 280 may also be attached to the opposing first end 236 of the neighboring shroud segment 212 (a second shroud segment). Furthermore, it will be appreciated that this seal arrangement 276 may be common for other inter-segment joints 286 of the shroud assembly 210 as well.

Figure 11:
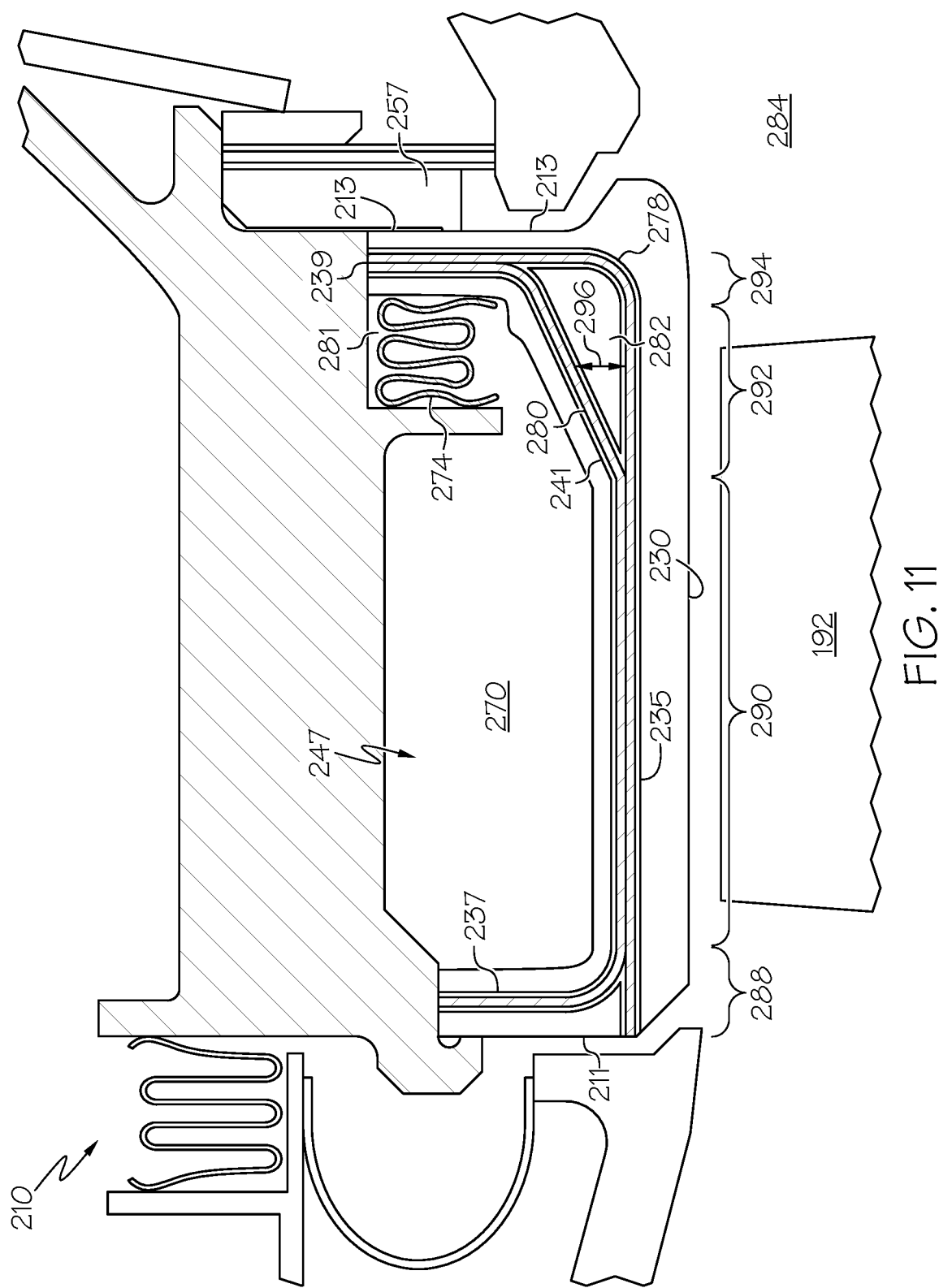
FIG. 11 is a section view of an inter-segment joint of the turbine shroud assembly taken along the line 11-11 of FIG. 2.

The third sealing member 278 and the fourth sealing member 280 may be received in the grooves 233 (FIG. 7) of the second end 238 as shown in FIG. 3, and it will be appreciated that the third and fourth sealing members 278, 280 may also be received within the grooves 233 of the opposing first end 236 of the neighboring shroud segment 212 within the shroud assembly 210. As shown in FIG. 11, the third sealing member 278 may be received within the first groove 235 and the third groove 239. Accordingly, the third sealing member 278 may extend in the axial direction proximate the leading edge 211 and may turn to extend radially proximate the trailing edge 213. The fourth sealing member 280 may be received within the second groove 237, within portions of the first groove 235, within the fourth groove 241, and within portions of the third groove 239. Accordingly, the fourth sealing member 280 may extend in the radial direction proximate the leading edge 211, turn to extend in the axial direction, and may extend radially proximate the trailing edge 213.

Areas of the third sealing member 278 and the fourth sealing member 280 may overlap and may be layered in abutting contact with each other in some portions of the seal arrangement 276. For example, as shown in FIGS. 3 and 11, at a first portion 288 (a leading portion) of the seal arrangement 276, the third and fourth sealing members 278, 280 may be separated at a distance with the third sealing member 278 extending axially, and the fourth sealing member 280 extending radially. At a second portion 290 (an intermediate portion) of the seal arrangement 276, the third sealing member 278 and the fourth sealing member 280 may layer over each other in abutting contact within the first groove 235. At a third portion 292 (a chamber portion) of the seal arrangement 276, the third and fourth sealing members 278, 280 may be separated at a distance. Thus, the third and fourth sealing members 278, 280 may be arranged in-series in the radial direction within the third portion 292 because they are separated apart at a distance in the radial direction. Also, at a fourth portion 294 (a trailing portion) of the seal arrangement 276, the third and fourth sealing members 278, 280 may be layered over each other in abutting contact in the third groove 239.

Accordingly, in the third portion 292, the seal arrangement 276 may define an enclosed chamber 282. Specifically, the third and fourth sealing members 278, 280 the second end 238 of one shroud segment 212, and the opposing first end 236 of the neighboring shroud segment 212 may enclose and define the boundaries of the chamber 282. The chamber 282 may have a variety of shapes without departing from the scope of the present disclosure. For example, the chamber 282 may be tapered and wedge-shaped in some embodiments. Accordingly, a width 296 of the chamber 282 (measured in the radial direction) may vary along the axial direction. In some embodiments, the chamber 282 may be oriented such that the width 296 increases gradually in the rearward direction along the axis 180.

During operation of the gas turbine engine 100, tips of the blades on the rotor assembly 192 (FIGS. 1 and 11) rotate relative to the inner diameter surface 230 of the shroud segment 212. The shroud segments 212 may heat up to relatively high temperatures. To regulate the temperature of the shroud segments 212, a cooling gas flow (e.g., air diverted from the core flow of the engine 100 upstream of the combustion section 140) may be directed through the fastener 260, into the inlet 248 of the internal cooling passage 246. The flow may be directed into the first chamber 250, through the first impingement apertures 253, and into the second chamber 252. Flow from the first impingement apertures 253 may be directed toward the trailing backside surface 221 for cooling the shroud segment 212. Then, the flow may be directed forward (i.e., re-directed) along the axis 180 into the third chamber 254 (FIG. 9). The flow may be directed, through the second impingement apertures 255 from the third chamber 254 to the fourth chamber 256. Flow from the second impingement apertures 255 may be directed toward the forward backside surface 223 for further cooling of the shroud segment 212. The fluid flow may exit the shroud segment 212 via the outlets 258. Additionally, some of the cooling fluid may flow from the inlet 248, through the third impingement aperture 243 (FIG. 8), to the fourth chamber 256, and out the outlets 258.

The internal cooling passages 246 may be defined within the shroud segments 212 such that the mass flow at the inlet 248 is substantially equal to the mass flow at the outlets 258. In other words, the internal cooling passage 246 may be sealed along its flow path (from the inlet 248 to the outlets 258), and there may be no leakage path for fluid in the cooling passages 246. The flow may then flow back into the core flow path of the engine 100 through one or more gaps. For example, the cooling gas may flow into the inter-segment joints 286 between neighboring pairs of the shroud segments 212. Ultimately, the cooling gas may flow radially inward to return to the core flow path.

This flow of air may provide a cooling effect to the shroud segment 212, thereby improving efficiency and effectiveness of the gas turbine engine 100. As discussed above, each shroud segment 212 may be constrained and sealed individually to the shroud support 214. Also, substantially all cooling flow impinges the backside of the shroud segment 212 multiple times (e.g., twice) in succession. As such, for a given amount of cooling mass flow, impingement is multiplied (e.g., by two). Thus, impingement velocities may be higher, and cooling effectiveness may be increased.

Additionally, as discussed above, the seal arrangement 276 at the inter-segment joints 286 may improve flow characteristics. In particular, because there are the sealing members 278, 280 arranged in-series with the chamber 282 defined therebetween, there may be increased resistance to the flow of air from the outlet chamber 270 to the core flow path 284. Ultimately, a larger percentage of air entering the engine 100 may be used for performing useful work, rather than being used for providing cooling air for the shroud assembly 210, and engine efficiency is increased.

More specifically, the arrangement of the third and fourth sealing members 278, 280 (FIGS. 3 and 11) may define the chamber 282 proximate the trailing edge 213 and between the outlet chamber 270 and the core flow path 284. Also, proximate the trailing edge 213, the assembly 210 may include the trailing edge space 281 with the second sealing member 274 extending across the joint 286. As such, there may be multiple (e.g., two) pressure drops along the axis 180 between the outlet chamber 270 and the core flow path 284. This dual-series pressure drop reduces inter-segment leakage at the trailing edge 213, wherein the static pressure of the flow path is lowest.

The shroud assembly 210 may be manufactured in a variety of ways without departing from the scope of the present disclosure. For example, the shroud segments 212 may be formed using multiple parts that are bonded together, that are inseparable, and/or that are integrally connected (e.g., via a brazing, laser welding, diffusion bonding, or other manufacturing process). In additional embodiments, the shroud segments 212 may be made from a single part produced, for example, by investment casting or additive manufacturing processes. In further embodiments, a casting core may be formed using an additive manufacturing technique, and then the casting core may be used to form features of the shroud segment 212 (e.g., ceramic stereo-lithography). Furthermore, in some embodiments, features of the segments 212 may be machined using turning, milling, grinding, electrical discharge machining (EDM), or other machining operations. Once formed, the shroud segments 212 may be attached to the shroud support 214 as discussed above, with the sealing arrangement 276 and the second sealing member 274 extending across the inter-segment joints 286.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A shroud assembly for a gas turbine engine comprising:
   a shroud support that extends arcuately about an axis;
   a plurality of shroud segments that are attached to the shroud support and that are arranged annularly about the axis at different circumferential positions with respect to the axis, the plurality of shroud segments including a first shroud segment and a second shroud segment, an inter-segment joint defined circumferentially between the first and second shroud segments;
   a seal arrangement that extends circumferentially across the inter-segment joint; and
   the seal arrangement, the first shroud segment, and the second shroud segment cooperatively defining a seal chamber that is enclosed.

2. The shroud assembly of claim 1, wherein the intersegment joint includes a leading edge and a trailing edge that are separated apart at a distance along the axis; and
   wherein the seal chamber is disposed proximate the trailing edge and is spaced apart at a distance from the leading edge.

3. The shroud assembly of claim 1, wherein the seal arrangement includes a first sealing member and a second sealing member that are arranged in-series with the seal chamber separating the first sealing member and the sealing member apart at a distance.

4. The shroud assembly of claim 1, wherein the seal arrangement includes a first sealing member and a second sealing member;
   wherein, at a first portion of the seal arrangement, the first sealing member and the second sealing member overlap and are in abutting contact;
   wherein, at a second portion of the seal arrangement, the first sealing member and the second sealing member are separated apart at a distance to define the seal chamber;
   wherein, at a third portion of the seal arrangement, the first sealing member and the second sealing member overlap and are in abutting contact; and
   wherein the second portion is disposed between the first portion and the third portion.

5. The shroud assembly of claim 4, wherein the inter-segment joint includes a leading edge and a trailing edge that are separated apart along an axial direction;
   wherein the first sealing member extends in the axial direction proximate the leading edge and turns to extend in the radial direction proximate the trailing edge;
   wherein the second sealing member extends in the radial direction proximate the leading edge, turns to extend in the axial direction and overlap the first sealing member, and extends in the radial direction proximate the trailing edge.

6. The shroud assembly of claim 4, wherein the inter-segment joint includes a leading edge and a trailing edge that are separated apart along an axial direction;
   wherein, at a leading portion of the seal arrangement proximate the leading edge, the first sealing member and the second sealing member are separated apart at a distance; and
   wherein the first portion is disposed between the leading portion and the second portion.

7. The shroud assembly of claim 1, wherein the first shroud segment includes a first circumferential end with a plurality of first grooves;

wherein the second shroud segment includes a second circumferential end with a plurality of second grooves; and wherein the seal arrangement is received within the plurality of first grooves and the plurality of second grooves.

8. The shroud assembly of claim 7, wherein the plurality of first grooves intersect.

9. The shroud assembly of claim 1, wherein the inter-segment joint includes a leading edge and a trailing edge that are separated apart along an axial direction, a rearward direction being defined from the leading edge to the trailing edge;
wherein the seal chamber has a width measured in a radial direction; and
wherein the seal chamber is tapered along the axial direction such that the width increases gradually in the rearward direction.

10. The shroud assembly of claim 1, further comprising a second sealing member that extends across the inter-segment joint;
wherein the second sealing member is sealed to the shroud support, the first shroud segment, and the second shroud segment; and
wherein the second sealing member and the seal chamber are both disposed proximate a trailing edge of the inter-segment joint.

11. The shroud assembly of claim 10, wherein the shroud support includes a first axial surface;
wherein the first shroud segment and the second shroud segment both have a respective second axial surface that faces opposite the first axial surface; and
wherein the second sealing member is sealed to the first axial surface and to the second axial surfaces.

12. The shroud assembly of claim 11, wherein the second sealing member is configured to flex in an axial direction.

13. The shroud assembly of claim 1, further comprising a cooling flow path cooperatively defined by the shroud support and the first shroud segment;
wherein the cooling flow path includes a shroud support inlet extending radially through the shroud support; and
wherein the internal cooling passage is fluidly connected to the shroud support inlet.

14. A method of manufacturing a shroud case assembly comprising:
attaching a plurality of shroud segments to a shroud support, the shroud support extending arcuately about an axis, the plurality of shroud segments arranged annularly about the shroud support at different circumferential positions with respect to the axis, the plurality of shroud segments including a first shroud segment and a second shroud segment, an inter-segment joint defined circumferentially between the first and second shroud segments; and
extending a seal arrangement circumferentially across the inter-segment joint to define a seal chamber that is enclosed within the inter-segment joint between the first and second shroud segments.

15. The method of claim 14, wherein extending the seal arrangement across the inter-segment joint includes disposing the seal chamber proximate a trailing edge of the inter-segment joint and spacing the seal chamber apart at a distance from a leading edge of the inter-segment joint.

16. The method of claim 14, wherein extending the seal arrangement across the inter-segment joint includes extending a first sealing member and a second sealing member across the inter-segment joint;
wherein, at a first portion of the seal arrangement, the first sealing member and the second sealing member overlap and are in abutting contact;
wherein, at a second portion of the seal arrangement, the first sealing member and the second sealing member are separated apart at a distance to define the seal chamber;
wherein, at a third portion of the seal arrangement, the first sealing member and the second sealing member overlap and are in abutting contact; and
wherein the second portion is disposed between the first portion and the third portion.

17. The method of claim 14, wherein extending the seal arrangement across the inter-segment joint includes inserting the seal arrangement within at least one first groove of the first shroud segment and inserting the seal arrangement within at least one second groove of the second shroud segment.

18. The method of claim 14, wherein the inter-segment joint includes a leading edge and a trailing edge that are separated apart along an axial direction, a rearward direction being defined from the leading edge to the trailing edge;
wherein the seal chamber has a width measured in a radial direction; and
wherein the seal chamber is tapered along the axial direction such that the width increases gradually in the rearward direction.

19. The method of claim 14, further comprising extending a second sealing member across the inter-segment joint and sealing the second sealing member to the shroud support, the first shroud segment, and the second shroud segment; and
wherein the second sealing member and the seal chamber are both disposed proximate a trailing edge of the inter-segment joint.

20. A gas turbine engine comprising:
a rotor assembly of a turbine section; and
a shroud assembly that surrounds the rotor assembly, the shroud assembly including:
a shroud support that extends arcuately about an axis;
a plurality of shroud segments that are attached to the shroud support and that are arranged annularly about the axis at different circumferential positions with respect to the axis, the plurality of shroud segments including a first shroud segment and a second shroud segment, an inter-segment joint defined circumferentially between the first and second shroud segments;
a cooling flow path cooperatively defined by the shroud support and the first shroud segment, the cooling flow path fluidly connected to the inter-segment joint;
a seal arrangement that extends circumferentially across the inter-segment joint, the seal arrangement including a first sealing member and a second sealing member;
a third sealing member that extends across the inter-segment joint, the third sealing member being sealed to the shroud support, the first shroud segment, and the second shroud segment proximate a trailing edge of the shroud assembly;
the seal arrangement including a first portion proximate a leading edge of the shroud assembly at which the first sealing member and the second sealing member overlap and are in abutting contact;
the seal arrangement including a chamber portion at which the first sealing member and the second sealing member are separated apart at a distance to define a wedge-shaped seal chamber that is enclosed between the first and second shroud segments;

the seal arrangement including a third portion proximate the trailing edge of the shroud assembly at which the first sealing member and the second sealing member overlap and are in abutting contact; and wherein the chamber portion is enclosed and disposed between the first portion and the third portion.

* * * * *